(12) United States Patent
Terrel et al.

(10) Patent No.: US 8,965,164 B2
(45) Date of Patent: Feb. 24, 2015

(54) OPTICAL DEVICE USING A HOLLOW-CORE PHOTONIC-BANDGAP FIBER

(75) Inventors: Matthew A. Terrel, Houston, TX (US); Michel J. F. Digonnet, Palo Alto, CA (US); Shanhui Fan, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 872 days.

(21) Appl. No.: 12/575,330

(22) Filed: Oct. 7, 2009

(65) Prior Publication Data

US 2010/0021115 A1    Jan. 28, 2010

Related U.S. Application Data

(63) Continuation of application No. 12/194,490, filed on Aug. 19, 2008, which is a continuation of application No. 11/681,073, filed on Mar. 1, 2007, now Pat. No. 7,430,345.

(60) Provisional application No. 60/778,230, filed on Mar. 2, 2006.

(51) Int. Cl.
*G02B 6/032* (2006.01)
*G02B 6/00* (2006.01)
*G02F 1/01* (2006.01)
*G02B 6/02* (2006.01)

(52) U.S. Cl.
CPC .......... *G02F 1/0136* (2013.01); *G02B 6/02304* (2013.01); *G02B 6/02328* (2013.01); *G02F 1/0134* (2013.01); *G02F 2202/32* (2013.01)
USPC ........................................... 385/125; 385/11

(58) Field of Classification Search
USPC .................................................... 385/11, 125
See application file for complete search history.

(56) References Cited

U.S. PATENT DOCUMENTS

| 4,606,605 | A | 8/1986 | Ashkin et al. |
| 5,764,833 | A | 6/1998 | Kakii et al. |
| 6,587,622 | B2 | 7/2003 | Maroney et al. |
| 6,847,771 | B2 | 1/2005 | Fajardo et al. |
| 7,620,283 | B2 * | 11/2009 | Terrel et al. .................... 385/125 |
| 2003/0185510 | A1 * | 10/2003 | Westbrook ....................... 385/37 |

FOREIGN PATENT DOCUMENTS

| EP | 0227366 | 7/1987 |
| JP | 2000-515653 | 11/2000 |
| JP | 2004 102281 | 4/2004 |
| JP | 2005-502079 | 1/2005 |
| WO | WO 98/53352 | 11/1998 |
| WO | WO 00/49436 | 8/2000 |

(Continued)

OTHER PUBLICATIONS

Blazephotonics; Hollow Core Photonic Bandgap Fibers: June Issue: 1-4, 2004.

(Continued)

*Primary Examiner* — Omar R Rojas
(74) *Attorney, Agent, or Firm* — Knobbe, Martens, Olson & Bear LLP

(57) ABSTRACT

An optical device includes a hollow-core photonic-bandgap fiber, wherein at least a portion of the hollow-core photonic-bandgap fiber is adjustably axially twisted.

27 Claims, 20 Drawing Sheets

(56) References Cited

FOREIGN PATENT DOCUMENTS

| WO | WO 03/021314 | 3/2003 |
|---|---|---|
| WO | WO 03/058309 | 7/2003 |

OTHER PUBLICATIONS

G. Bouwmans et al., "*Properties of a hollow-core photonic bandgap fiber at 850 nm wavelength*," Opt. Express, vol. 11, pp. 1613-1620 (2003).

H. C. Lefevre, "Single mode fibre fractional wave devices and polarisation controllers," Electronics Letters, vol. 16, No. 20: pp. 778-780 (1980).

International Search Report and Written Opinion for PCT/US2007/005268 mailed Aug. 20, 2007.

Libori et al. "High-birefringent photonic crystal fiber," Optical Fiber Communication Conference (OFC), Technical Digest Postconference Edition, Anaheim, CA, Mar. 17-22, 2001, pp. TuM2-1-TuM2-3, XP010545786.

M. Wegmuller et al., "Experimental investigation of the polarization properties of a hollow core photonic bandgap fiber for 1550 nm," Opt. Express, vol. 13, pp. 1457-1467 (2005).

M.S. Alam et al., "*High group birefringence in air-core photonic bandgap fibers*," Opt. Express, vol. 30, pp. 824-826 (2005).

R. Ulrich et al., "Single-Mode Fiber-Optical Polarization Rotator." Applied Optics, vol. 18, No. 11: 1857-1861, 1979.

R. Ulrich et al., "Polarization optics of twisted single-mode fibers," Appl. Opt., vol. 18, pp. 2241-2251 (1979).

Terrel et al., "A Polarization Controller for Air-Core Photonic-Bandgap Fiber." 2006 Optical Fiber Communications Conference and National Fiber Optic Engineers Conference, Mar. 5-10, 2006, Anaheim, CA, USA, OW156, XP002445419.

Zhou et al. "PMD Characteristics of Twisted Photonic Crystal Fibre," Electronics Letters, vol. 41, No. 7, pp. 403-405, Mar. 31, 2005.

Examination Report for EP Application No. 07 751 996.5-2205 dated May 7, 2010.

Office Action for Japanese Patent Application No. 2008-557380 dated Oct. 2, 2012.

\* cited by examiner

OPTICAL DEVICE USING A HOLLOW-CORE PHOTONIC-BANDGAP FIBER

CLAIM OF PRIORITY

The present application is a continuation of U.S. patent application Ser. No. 12/194,490, filed Aug. 19, 2008, incorporated in its entirety by reference herein, which is a continuation of U.S. patent application Ser. No. 11/681,073, filed Mar. 1, 2007, incorporated in its entirety by reference herein and which claims the benefit of U.S. Provisional Patent Appl. No. 60/778,230, filed Mar. 2, 2006, which is incorporated in its entirety by reference herein.

BACKGROUND OF THE INVENTION

1. Field of the Invention

This application relates generally to the field of polarization controllers for fiber optic applications.

2. Description of the Related Art

In hollow-core photonic-bandgap fibers (PBFs), the majority of the fundamental mode power propagates in air (see, e.g., specifications for HC-1550-02 hollow-core photonic-bandgap fiber available from Crystal Fibre A/S of Birkerød, Denmark). This property makes hollow-core fibers promising for a number of applications, including those in which high peak powers and/or low nonlinearity are desired.

In general, it is desirable to be able to control the state of polarization (SOP) of light propagating in a fiber, and currently no such means exist in hollow-core fibers. In conventional single-mode fibers (SMFs), polarization control is routinely achieved by bending the fiber into loops to induce birefringence through strain (see, e.g., H. C. Lefevre, "Single mode fractional wave devices and polarisation controllers," Electronics Letters, Vol. 16, pages 778-780 (1980)). FIG. 1 schematically illustrates an SMF bent to form a pair of loops having a radius of curvature R. The induced birefringence $\Delta n$ is inversely proportional to the square of the radius of curvature (i.e., $\Delta n \propto 1/R^2$). The total phase delay $\delta_l$ produced by the loops is proportional to the number of loops $N_{loops}$ divided by the radius of curvature of the loops (i.e., $\delta_l \propto N_{loops}/R$). For an SMF28 fiber, a quarter-wave plate can be produced using two loops each having a radius of curvature of about 2.5 centimeters. Two such quarter-wave plates can be used as a true universal polarization controller to transform any input state of polarization (SOP) into any output SOP. Such a polarization controller can be described as transforming any input SOP to an output SOP that reaches any point on the Poincaré sphere by both rotating the SOP and changing its ellipticity.

SUMMARY OF THE INVENTION

In certain embodiments, a polarization controller is provided. The polarization controller comprises a first hollow-core photonic-bandgap fiber, wherein at least a portion of the first hollow-core photonic-bandgap fiber has a first longitudinal axis and is twisted about the first longitudinal axis.

In certain embodiments, a polarization controller is provided. The polarization controller comprises a hollow-core photonic-bandgap fiber, wherein at least a portion of the hollow-core photonic-bandgap fiber has a longitudinal axis and is twisted about the longitudinal axis.

In certain embodiments, a method of modifying a state of polarization of an optical signal is provided. The method comprises providing an optical signal having a first state of polarization. The method further comprises propagating the optical signal through at least a portion of a hollow-core photonic-bandgap fiber having a longitudinal axis and twisted about the longitudinal axis. The optical signal is outputted from the twisted portion of the hollow-core photonic-bandgap fiber with a second state of polarization different from the first state of polarization.

DETAILED DESCRIPTION OF THE PREFERRED EMBODIMENT

Most of the light mode propagating through a conventional single-mode fiber (SMF) travels through the silica of the SMF. A conventional SMF has a low intrinsic birefringence, but has a large birefringence induced by bending the SMF. Thus, a loop polarization controller using a conventional SMF works well.

In contrast, a hollow-core photonic-bandgap fiber (PBF) is not readily amenable to polarization control by this method. Most of the mode propagating through the hollow-core PBF travels in the strain-free hollow core. Such hollow-core PBFs have a high intrinsic birefringence, but only a small birefringence induced by bending. For example, there is no measurable difference in the induced birefringence of a hollow-core PBF bent with a radius of curvature of 10 centimeters and one bent with a radius of curvature of 1.5 centimeters. Thus, a loop polarization controller using a hollow-core PBF is not practical because the effects of strain due to bending are too small. As used herein, the term "hollow-core" is used in its broadest sense and includes configurations in which the fiber has a hollow core filled with air or any gas or combination of gases at atmospheric pressure or any other pressure. As used herein, the term "fiber" is used in its broadest sense and includes a complete length of fiber or a fractional portion or segment of a fiber encompassing one end, two ends, or neither end of the fiber.

Figure 1:
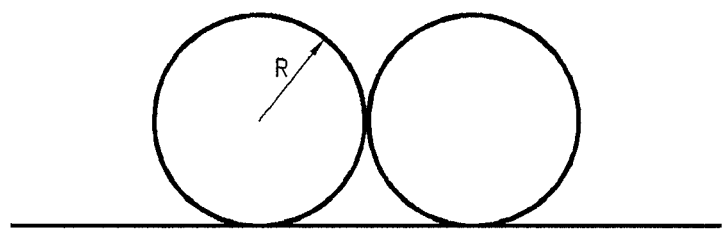
FIG. 1 schematically illustrates a single-mode fiber bent to form a pair of loops having a radius of curvature R.
Figure 2:
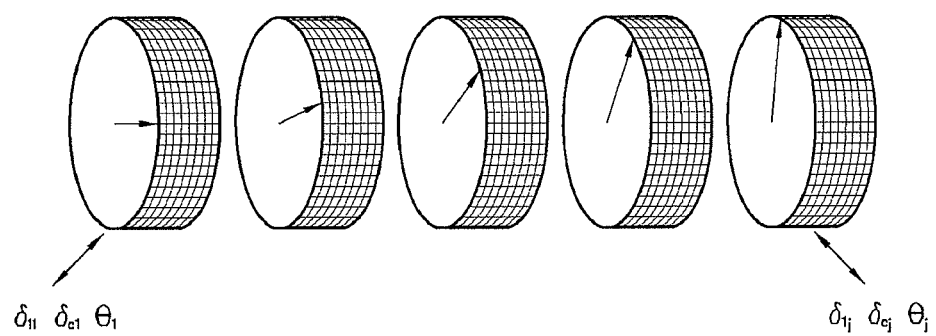
FIG. 2 schematically illustrates a birefringent fiber viewed as a collection of wave plates, each plate having a linear phase delay $\delta_l$, a circular phase delay $\delta_c$, and a birefringence axes orientation $\theta$.

To understand the effects of axially twisting a fiber on its birefringence, the simple case of twisting the free end of a birefringent fiber can be considered. One portion (e.g., end) of the fiber is attached to a support located a short distance L from its output end, and the output end is twisted by an angle τ. A birefringent fiber may be viewed as a collection of wave plates, each plate having a linear phase delay $\delta_l$, a circular phase delay $\delta_c$, and a birefringence axes orientation θ, as schematically illustrated by FIG. 2. Linear birefringence causes the linear phase delay $\delta_l$ between orthogonal linear polarizations. For example, a quarter-wave linear birefringent plate at 45° to a linearly polarized signal causes a phase delay of π/2 radians, thereby changing the state of polarization of the signal from being linearly polarized signal to being circularly polarized. Circular birefringence causes the circular phase delay $\delta_c$ between opposite (e.g., left and right) circular polarizations. For example, a quarter-wave circular birefringent plate causes a phase delay of π/2 radians, thereby changing a 45° linear polarization to a horizontal linear polarization.

When the fiber end is twisted, two mechanisms contribute to altering its birefringence. First, the fiber experiences a shear strain due to the twisting, which induces a circular phase delay proportional to the amount of twist. In a conventional single-mode fiber, the magnitude of this strain-induced circular phase delay is small (e.g., $\delta_c = -g\tau$, with g=0.13-0.16). For example, in a typical conventional fiber, a twist of 180° produces less than 15° of polarization rotation. Previously, Ulrich and Simon (R. Ulrich and A. Simon, "Polarization optics of twisted single-mode fibers," Appl. Opt., Vol. 18, pages 2241-2251 (1979)) proposed axially twisting a short length of SMF in its middle to utilize this effect to produce a fast-slow mode interchanger.

Figure 3A:
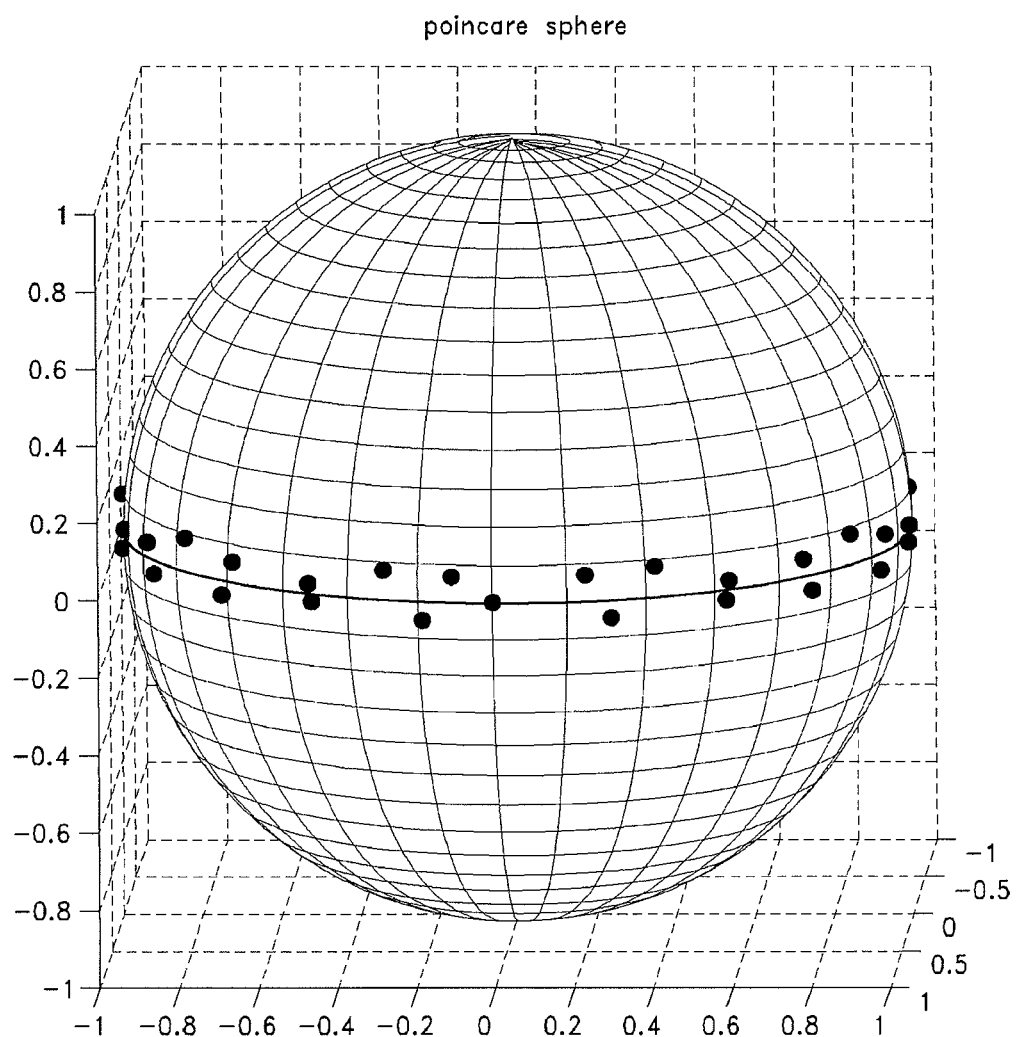
FIGS. 3A and 3B illustrate the Poincaré spheres (for on-axis input and off-axis input, respectively) for a configuration in which a fiber has a length much greater than the beat length of the fiber.
Figure 3A:
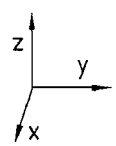
Figure 3B:
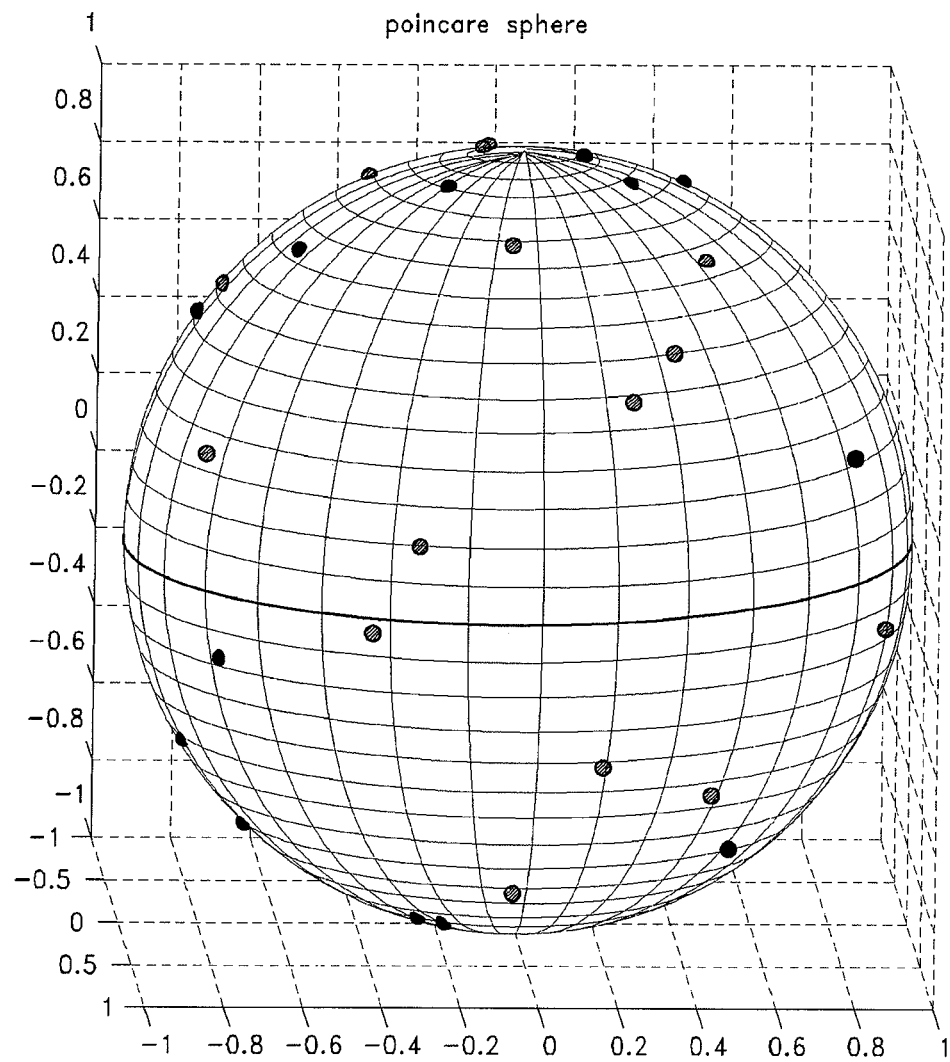
Figure 3B:
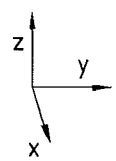

Second, axially twisting a fiber alters its birefringence by reorienting the axis of intrinsic linear birefringence along the twisted section of the fiber, causing a circular birefringence. Thus, the orientation θ changes for each plate such that the axes of the individual wave plates are rotated relative to each other. The magnitude of this effect depends on the ratio of the length L of the twisted portion to the beat length $L_b$ of the fiber. The beat length is the length over which two orthogonally polarized signals, initially in phase, passes in order to achieve a 2π radians phase difference between the two signals, and the beat length can be wavelength-dependent. If $L \gg L_b$, (e.g., a 10-centimeter segment of a conventional polarization-maintaining (PM) fiber with a beat length $L_b$=5 millimeters), twisting will alter the signal SOP by large amounts relative to the input SOP, but the ellipticity of the output SOP does not change. FIGS. 3A and 3B illustrate the Poincaré spheres for such a configuration for on-axis input and off-axis input, respectively. For on-axis input (FIG. 3A), the polarization follows the twisted fiber axis and never moves towards the poles. For off-axis input (FIG. 3B), beating is obtained. Such a device therefore fails to act as a true universal polarization controller.

Figure 4A:
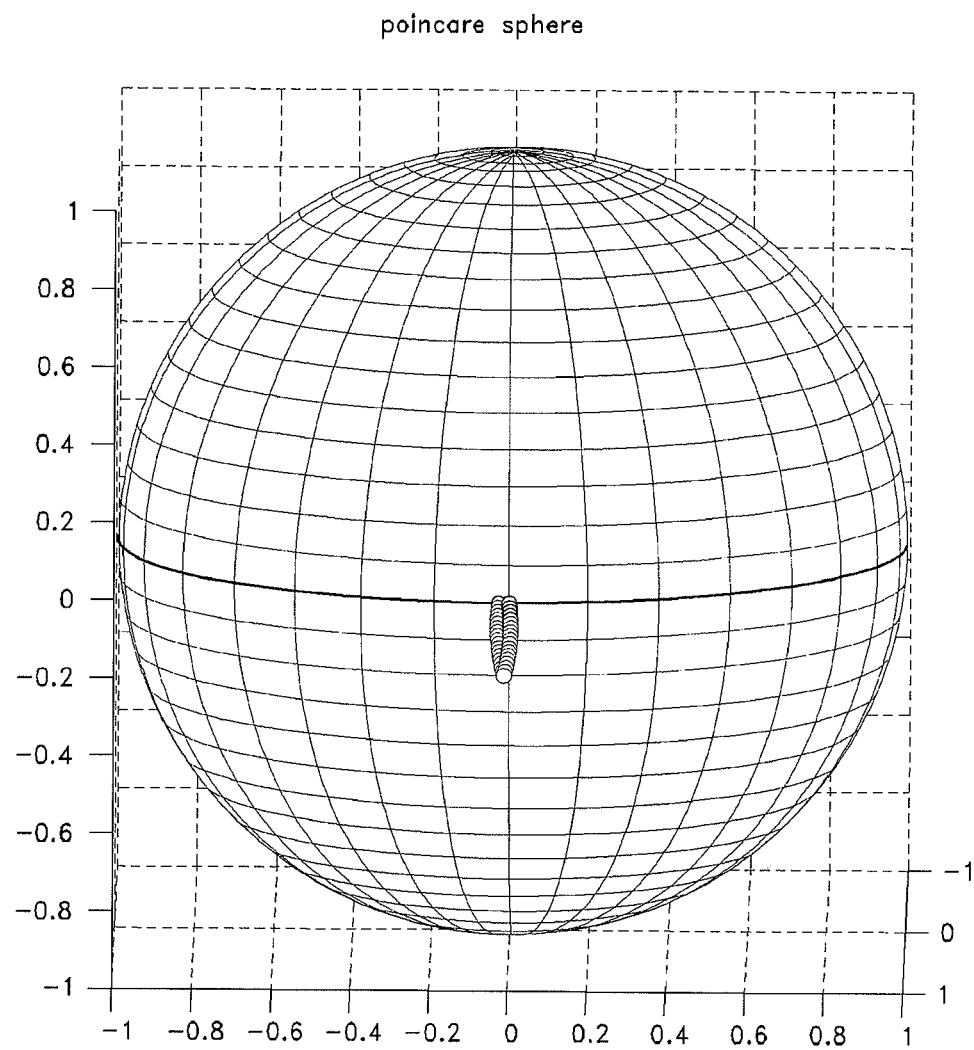
FIGS. 4A and 4B illustrate the Poincaré spheres (for on-axis input and off-axis input, respectively) for a configuration in which a fiber has a length much less than the beat length of the fiber.
Figure 4A:
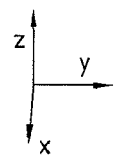
Figure 4B:
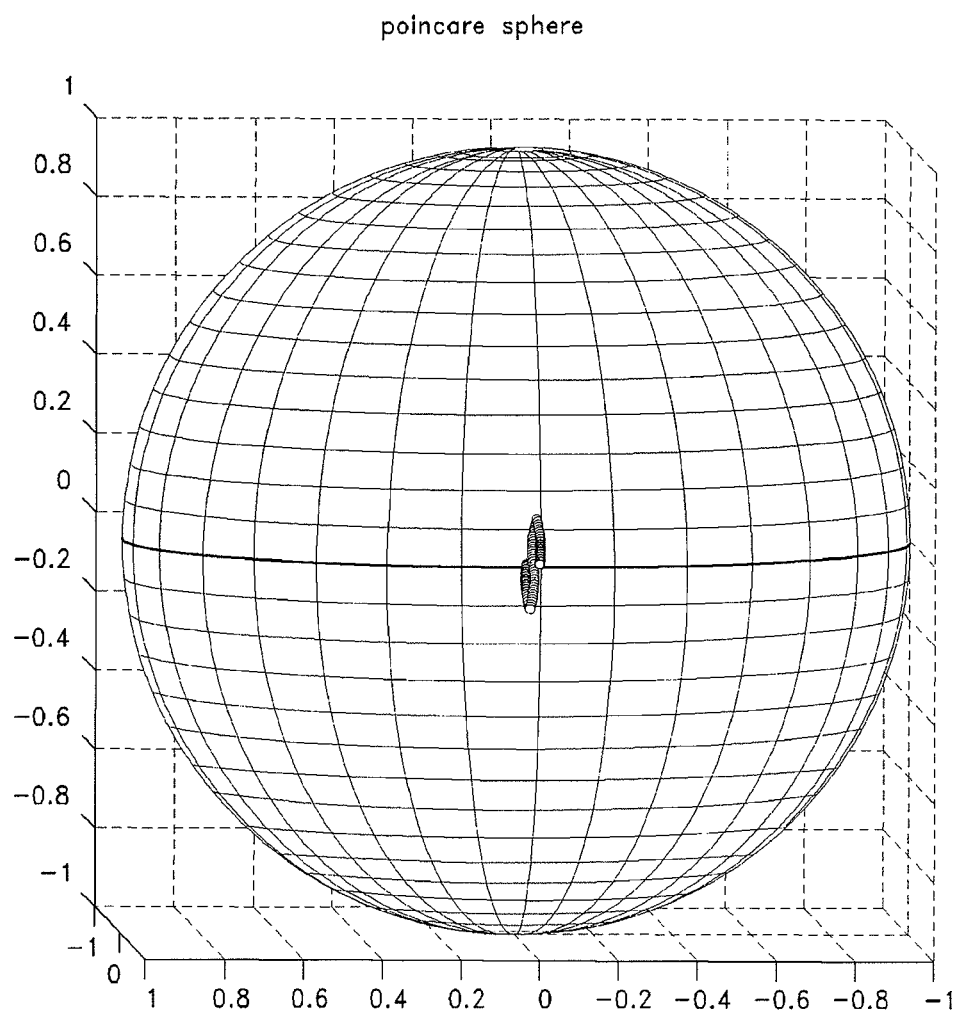
Figure 4B:
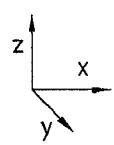

In the other extreme limit of $L \ll L_b$, (e.g., a 10-centimeter segment of a conventional low-birefringence SMF with a beat length of 1 meter), once the amount of twist exceeds a few degrees, the twist-induced circular birefringence far exceeds the intrinsic linear birefringence. The fiber then acts as a nearly pure circular birefringent element. FIGS. 4A and 4B illustrate the Poincaré spheres for such a configuration for on-axis input and off-axis input, respectively. In both cases, if the length of the twisted section of the fiber is much less than a beat length of the fiber, the polarization does not change much since there is little phase delay in the twisted section. Again, such a device cannot change the ellipticity of the output SOP and cannot perform as a polarization controller.

In contrast to these two extreme cases, a twisted fiber portion can be a useful polarization controller if the length of the twisted portion is of the order of the beat length ($L \approx L_b$). As the portion is twisted, both the orientation and ellipticity of the output SOP are modified. The condition L≈b cannot be met in practice for either a PM fiber (twisting a 5-millimeter long fiber requires a large torque that might break the fiber) or a standard SMF (which would require twisting a rather long fiber). This is one reason why such an approach is not used with conventional fibers.

Figure 5A:
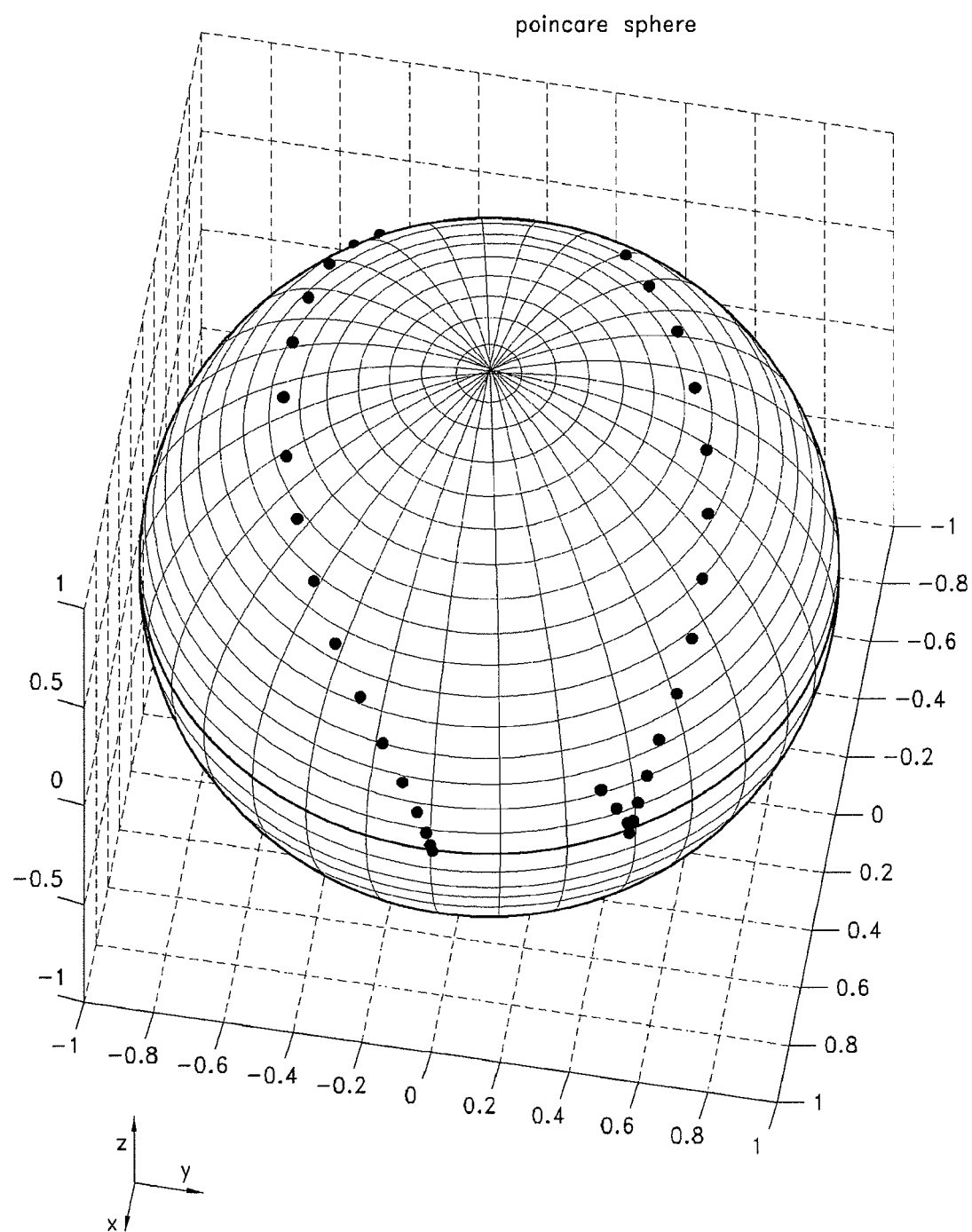
FIGS. 5A and 5B illustrate the Poincaré spheres (for on-axis input and off-axis input, respectively) for a portion of a hollow-core photonic-bandgap fiber having a length approximately equal to the beat length of the portion of the hollow-core photonic-bandgap fiber.
Figure 5B:
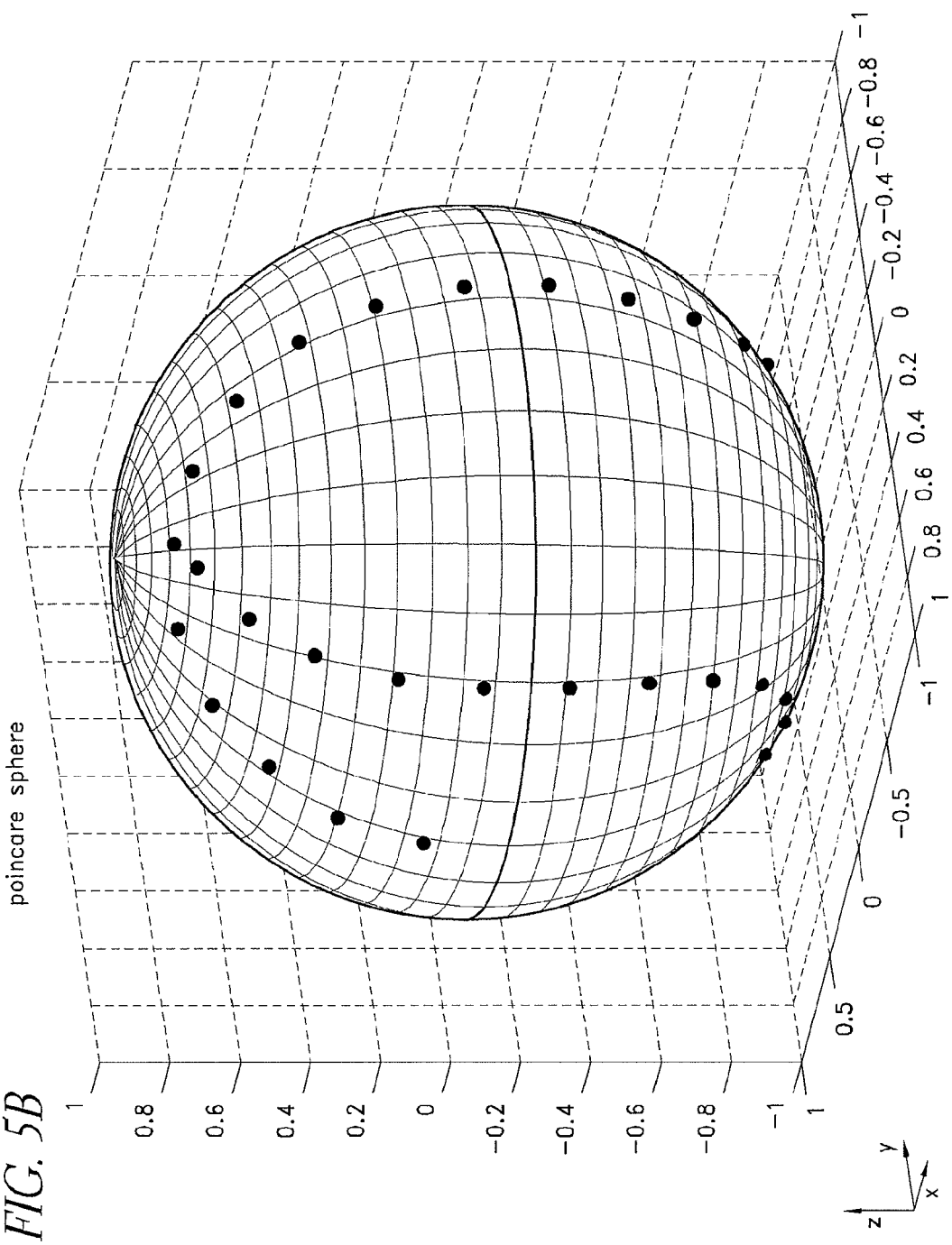

In a hollow-core fiber, very little power propagates in the silica regions where the strain is present, so the strain-induced circular phase delay is negligible and certainly smaller than in a conventional SMF. The main effect of an axial twist of a hollow-core PBF is to rotate the individual wave plates with respect to each other. Furthermore, since the linear birefringence of a hollow-core PBF is much greater than that of a conventional SMF such that the beat length of a hollow-core fiber is smaller than that of a conventional SMF (e.g., typically in a range between 1 centimeter and 10 centimeters) (See, e.g., M. Wegmuller et al., "*Experimental investigation of the polarization properties of a hollow core photonic bandgap fiber for* 1550 *nm*," Opt. Express, Vol. 13, pages 1457-1467 (2005); G. Bouwmans et al., "*Properties of a hollow-core photonic bandgap fiber at* 850 *nm wavelength*," Opt. Express, Vol. 11, pages 1613-1620 (2003); M. S. Alam et al., "*High group birefringence in air-core photonic bandgap fibers*," Opt. Express, Vol. 30, pages 824-826 (2005).) In certain embodiments, axially twisting one or more portions of a hollow-core PBF can induce significant changes to the polarization for both on-axis and off-axis input, as illustrated by FIGS. 5A and 5B, respectively. Certain embodiments described herein use this behavior to make a practical polarization controller in which the desired SOP is achieved by varying the amount of twist.

Certain embodiments described herein provide an alternative method for polarization control in hollow-core fibers using one or more twisted portions of fiber. Twisting a portion of a fiber between two fixed points spaced by about one beat length can significantly alter the output polarization orientation and ellipticity of the light propagating through the twisted portion of the hollow-core fiber, and can thus be used to control polarization for hollow-core fibers. Measurements of the polarization produced by certain embodiments described herein are in good agreement with a model based on the Jones matrix formalism. This principle can be used to demonstrate a simple, short, and effective polarization controller in a hollow-core fiber comprising three short sections of twisted fiber. In certain embodiments, the polarization controller performs with a 20-dB extinction ratio such that about 99% of the optical power is in the desired polarization.

Figure 6:
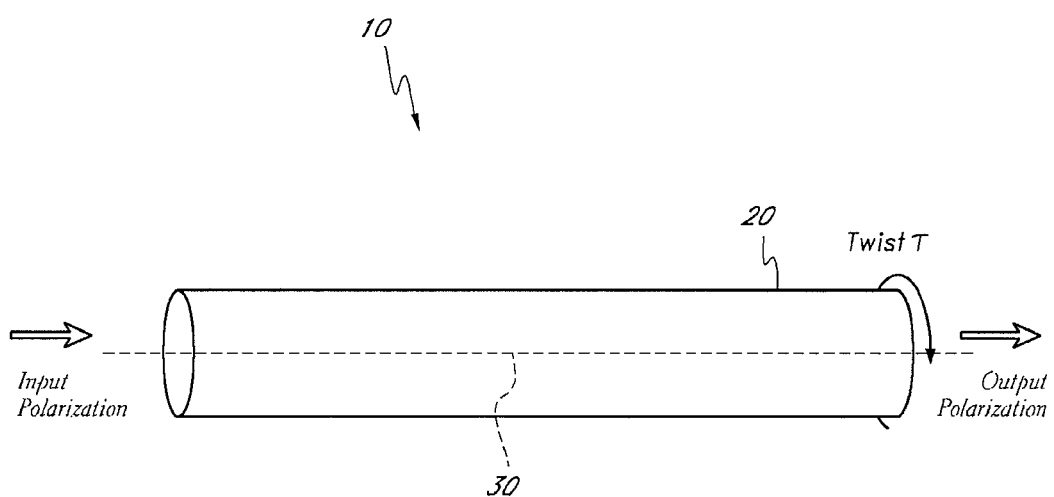
FIG. 6 schematically illustrates an example polarization controller in accordance with certain embodiments described herein.

FIG. 6 schematically illustrates an example polarization controller 10 in accordance with certain embodiments described herein. The polarization controller 10 comprises a hollow-core photonic-bandgap fiber (PBF) 20 wherein at least a portion of the hollow-core PBF 20 has a longitudinal axis 30 and is twisted about the longitudinal axis 30. While FIG. 6 schematically illustrates an embodiment in which the twisted portion of the hollow-core PBF 20 is at one end of the hollow-core PBF 20, in certain other embodiments, the twisted portion is between two fixed portions (e.g., the ends) of the hollow-core PBF 20, as discussed below with regard to FIG. 10. In certain embodiments, the portion of the hollow-core PBF 20 to be twisted is affixed to a rotation stage or a loop-type polarization controller (e.g., using epoxy or wax) and fixed portions of the hollow-core PBF 20 are affixed to stationary structures (e.g., using epoxy, wax, or mechanical clamps). Persons skilled in the art are able to affix one or more portions of the hollow-core PBF 20 to stationary and rotatable structures as appropriate to twist at least a portion of the hollow-core PBF 20 in accordance with certain embodiments described herein.

Figure 7:
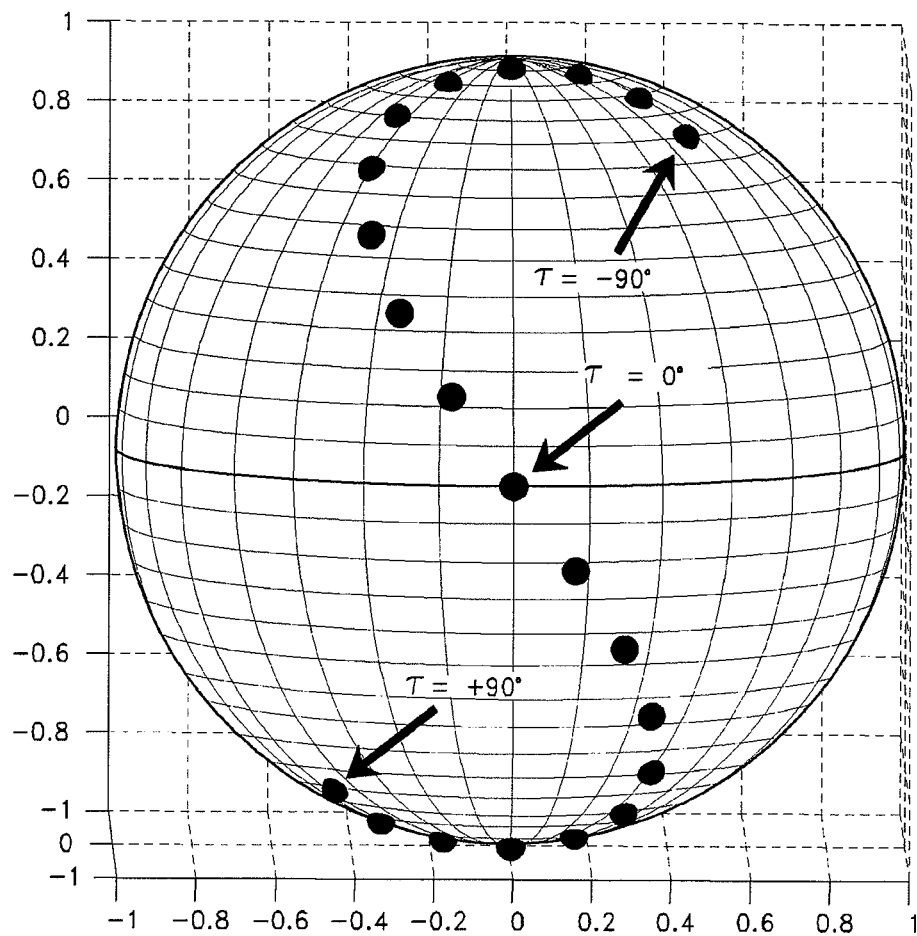
FIG. 7 illustrates the various output polarizations on the Poincaré sphere for variations of the twist angle $\tau$ of the hollow-core photonic-bandgap fiber of FIG. 6.
Figure 7:
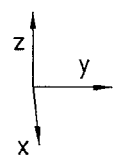

A polarization controller changes an input polarization into a different output polarization, and in certain embodiments, into many different output polarizations. As described herein, the twisting of at least a portion of the hollow-core PBF 20 by different amounts gives rise to changes of the output polarization for a fixed input polarization. The behavior of a twisted birefringent fiber can be quantified with the Jones matrix formalism. The Jones matrix of a twisted birefringent fiber is governed by three parameters: the fiber's intrinsic linear phase delay $\delta_l$, the circular phase delay $\delta_c$ (which is the sum of the intrinsic and strain-induced circular phase delays), and the twist angle $\tau$. In the basis of the fiber's principal axes, the Jones matrix M for a twisted birefringent fiber is given by Equation (1):

$$M = \begin{pmatrix} P & -Q^* \\ Q & P^* \end{pmatrix}$$

where $P = \cos(\Delta) - i(\delta_l/2)\sin(\Delta)/\Delta;$ $Q = (\tau + \delta_c/2)\sin(\Delta)/\Delta;$ and $\Delta = ((\delta_l/2)^2 + (\tau + \delta_c/2)^2)^{1/2}.$ These equations apply to any optical fiber (conventional low- or high-birefringent fibers and hollow-core fibers). In a hollow-core fiber, since the strain-induced circular birefringence is negligible, $\tau_c$ is just the intrinsic circular birefringence. As illustrated by FIG. 7, by varying the twist angle $\tau$ of the twisted portion of the hollow-core PBF 20 of FIG. 6, the output polarization can be varied significantly. In certain embodiments, the twisted portion of the hollow-core PBF 20 has a length approximately equal to a beat length of the twisted portion of the hollow-core PBF 20.

Figure 8:
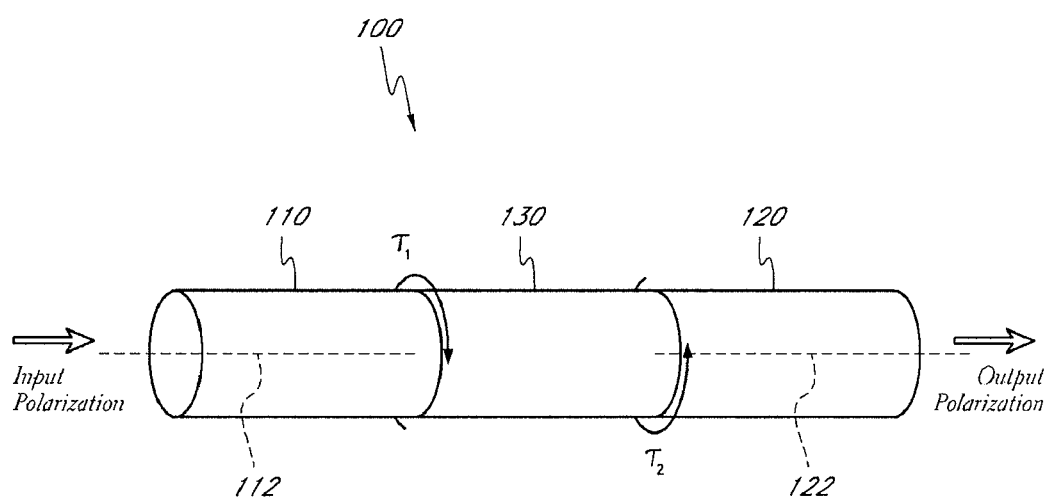
FIG. 8 schematically illustrates another example polarization controller compatible with certain embodiments described herein.

FIG. 8 schematically illustrates another example polarization controller 100 compatible with certain embodiments described herein. The polarization controller 100 comprises at least a portion of a first hollow-core PBF 110 and at least a portion of a second hollow-core PBF 120 optically coupled to the portion of the first hollow-core PBF 110. The portion of the first hollow-core PBF 110 has a first longitudinal axis 112 and is twisted about the first longitudinal axis in a first direction. The portion of the second hollow-core PBF 120 has a second longitudinal axis 122 and is twisted about the second longitudinal axis 122 in a second direction.

In certain embodiments, the second longitudinal axis 122 is substantially parallel to the first longitudinal axis 112, while in certain other embodiments, the second longitudinal axis 122 is not substantially parallel to the first longitudinal axis 112. At least one of the twisted portion of the first hollow-core PBF 110 and the twisted portion of the second hollow-core PBF 120 can be curved or bent such that either or both of the longitudinal axes 112, 122 are not straight lines. In certain embodiments, the second direction is generally opposite to the first direction, as schematically illustrated by FIG. 8. The twisted portion of the first hollow-core PBF 110 in certain embodiments has a length approximately equal to a first beat length of the twisted portion of the first hollow-core PBF 110. The twisted portion of the second hollow-core PBF 120 in certain embodiments has a length approximately equal to a second beat length of the twisted portion of the second hollow-core PBF 120.

As schematically illustrated by FIG. 8, in certain embodiments, the polarization controller 100 further comprises a single-mode fiber (SMF) 130 positioned between and optically coupled to the twisted portions of the first hollow-core PBF 110 and the second hollow-core PBF 120. The twisted portion of the first hollow-core PBF 110 comprises or is at an end of the first hollow-core PBF 110 which is coupled to the SMF 130 and the twisted portion of the second hollow-core PBF 120 comprises or is at an end of the second hollow-core PBF 120 which is coupled to the SMF 130. While twisting the hollow-core PBFs 110, 120 changes the polarization of the transmitted light significantly, twisting the SMF 130 has little or no effect on the polarization.

Figure 9:
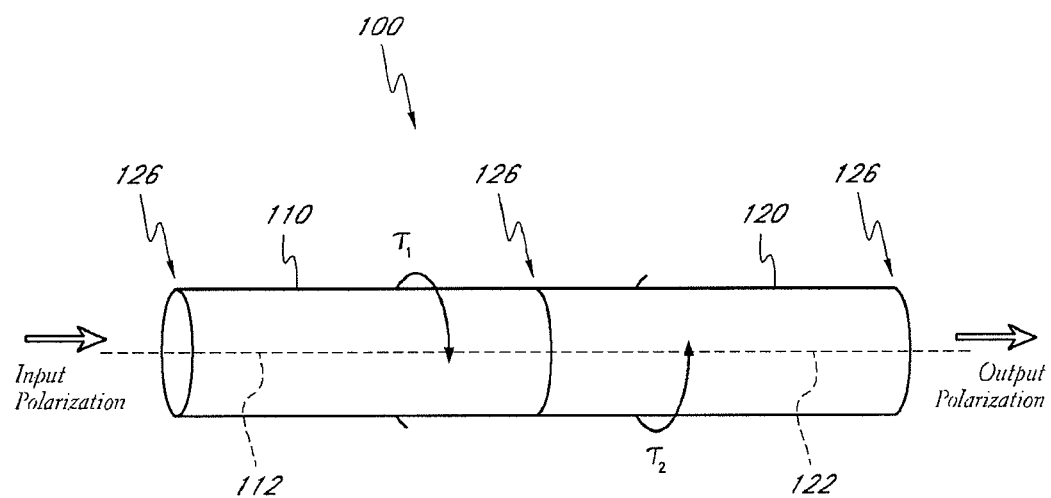
FIG. 9 schematically illustrates an example polarization controller in which the twisted portions of the first hollow-core photonic-bandgap fiber and the second hollow-core photonic-bandgap fiber are optically coupled together without a single-mode fiber therebetween.

FIG. 9 schematically illustrates an example polarization controller 100 in which the twisted portion of the first hollow-core PBF 110 and the twisted portion of the second hollow-core PBF 120 are optically coupled together without the SMF 130 therebetween. The twisted portion of the first hollow-core PBF 110 is between two fixed portions 126 of the first hollow-core PBF 110. The twisted portion of the second hollow-core PBF 120 is between two fixed portions 126 of the second hollow-core PBF 120. In certain embodiments, the fixed portions 126 of the first hollow-core PBF 110 comprise two ends of the first hollow-core PBF 110 and the fixed portions 126 of the second hollow-core PBF 120 comprise two ends of the second hollow-core PBF 120, one of which is coupled to an end of the first hollow-core PBF 110, as schematically illustrated by FIG. 9. In certain other embodiments, the first hollow-core PBF 110 and the second hollow-core PBF 120 are the same hollow-core PBF.

In certain embodiments, the second longitudinal axis 122 is substantially parallel to the first longitudinal axis 112. In certain embodiments, the second direction is generally opposite to the first direction, as schematically illustrated by FIG. 9. By combining multiple twisted portions of one or more hollow-core PBFs, certain embodiments described herein can transform arbitrary input polarization into an arbitrary desired output polarization by varying the amount of twist.

Figure 10:
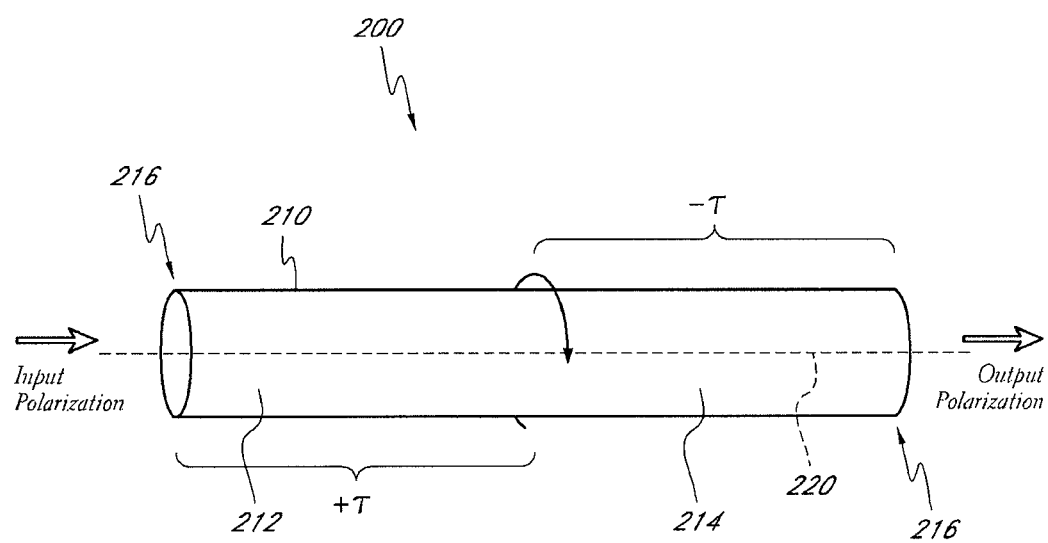
FIG. 10 schematically illustrates another example polarization controller in accordance with certain embodiments described herein.

FIG. 10 schematically illustrates another example polarization controller 200 in accordance with certain embodiments described herein. The polarization controller 200 comprises at least a portion of a hollow-core PBF 210 between two fixed portions 216 (e.g., two fixed ends) of the hollow-core PBF 210. The portion of the hollow-core PBF 210 has a longitudinal axis 220 and is twisted about the longitudinal axis 220. A twisted portion 212 of the hollow-core PBF 210 is twisted by an amount $+\tau$, and a portion 214 of the hollow-core PBF 210 between the two fixed portions 216 is twisted by an amount $-\tau$.

Figure 11:
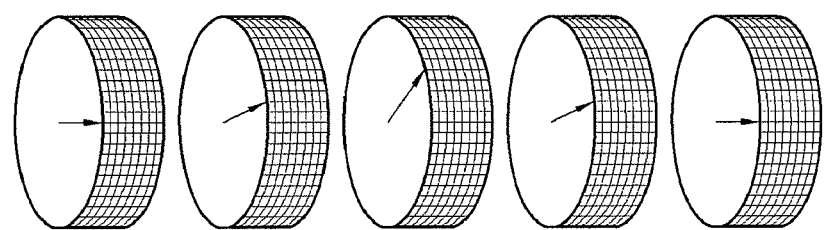
FIG. 11 illustrates a non-zero net alignment of birefringent axes due to twisting of a fiber.

The embodiment schematically illustrated by FIG. 10 can be expressed using the Jones matrix formalism. The Jones matrix for such a twisted fiber is the product of two matrices $M_+$ and $M_-$ of the form given in Equation (1). $M_+$ is the Jones matrix of the first twisted portion 212 of the hollow-core PBF 210 (twisted by $+\tau$), and $M_-$ is the Jones matrix of the second twisted portion 214 of the hollow-core PBF 210 (twisted by $-\tau$). The portion 212 twisted by an amount $+\tau$ can be expressed by Equation (2):

$$M_+ = \begin{pmatrix} P & -Q^* \\ Q & P^* \end{pmatrix}$$

where $P = \cos(\Delta) - i(\delta_l/2)\sin(\Delta)/\Delta;$ $Q = (\tau + \delta_c/2)\sin(\Delta)/\Delta;$ and $\Delta = ((\delta_l/2)^2 + (\tau + \delta_c/2)^2)^{1/2}.$ The portion 214 twisted by an amount $-\tau$ can be expressed by Equation (3):

$$M_- = \begin{pmatrix} P' & -Q'^* \\ Q' & P'^* \end{pmatrix}$$

where $P' = \cos(\Delta') - i(\delta_l/2)\sin(\Delta')/\Delta';$ $Q' = (\tau + \delta_c/2)\sin(\Delta')/\Delta';$ and $\Delta' = ((\delta_l/2)^2 + (-\tau + \delta_c/2)^2)^{1/2}.$ Equations (2) and (3) illustrate mathematically that the Jones matrices $M_+$ and $M_-$ are not inverses of one another. For the Jones matrices $M_+$ and $M_-$ to be inverses of one another, the conditions $P' = P^*$ and $Q' = -Q$ would have to apply since $M_+$ is unitary. Therefore, the polarization changes by the first portion 212 and by the second portion 214 formed by twisting the fiber between two fixed portions 216, as schematically illustrated by FIG. 10, do not cancel each another out. This behavior can be understood physically by realizing that there is a non-zero net alignment of birefringent axes due to the twist, as schematically illustrated by FIG. 11, and such a twisted element does alter the SOP significantly. A polarization controller can then be constructed by concatenating one or more twistable portions along the hollow-core PBF.

Figure 12:
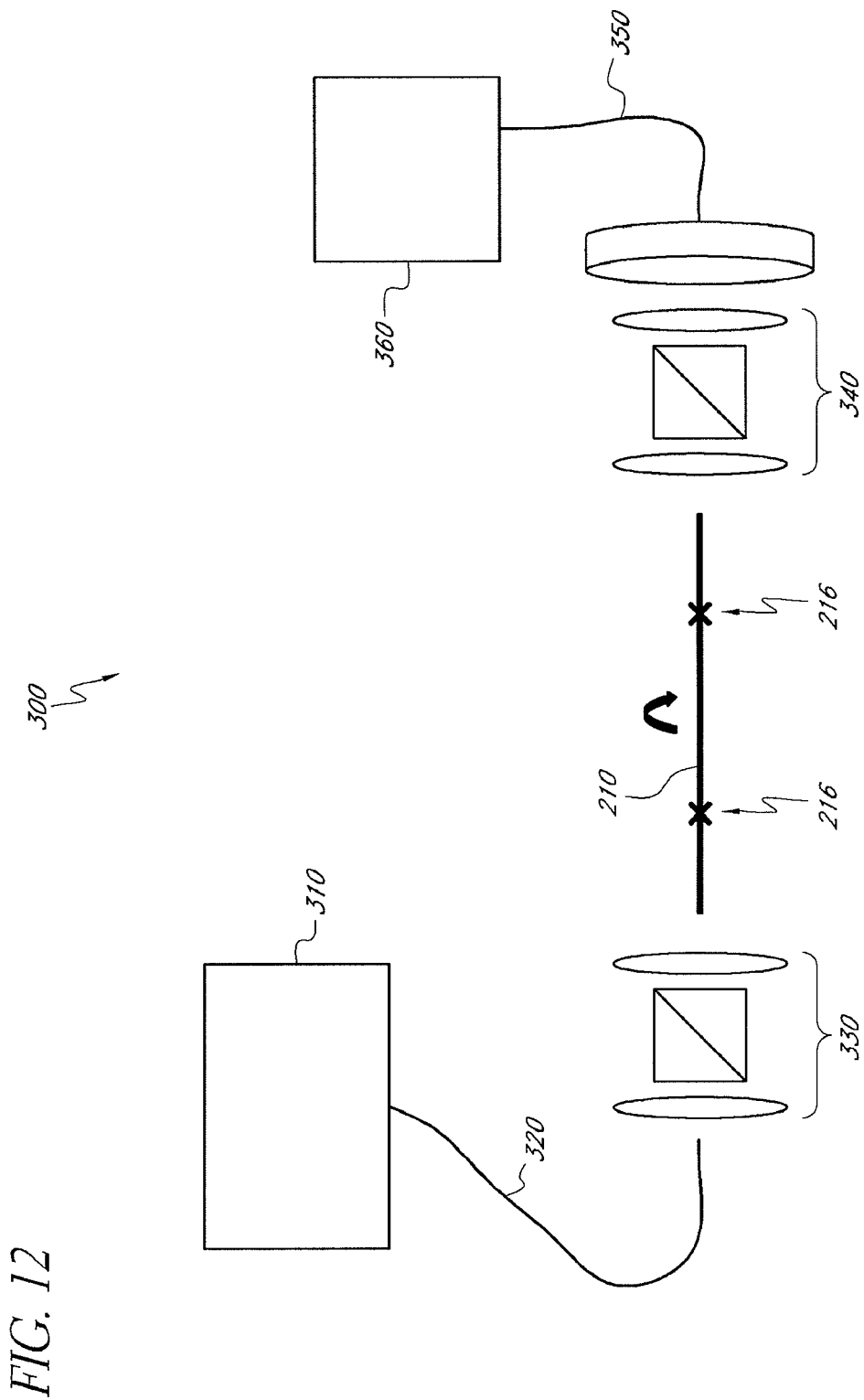
FIG. 12 schematically illustrates a configuration to twist at least a portion of a hollow-core photonic-bandgap fiber between two fixed portions and measure the effects on the state of polarization of a signal traversing the twisted portion of the hollow-core photonic-bandgap fiber.

FIG. 12 schematically illustrates a configuration 300 to twist at least a portion of a hollow-core PBF 210 between two fixed portions 216 and measure the effects on the SOP of a signal traversing the hollow-core PBF 210 (e.g., a 20-centimeter strand of HC-1550-02 available from Crystal Fibre A/S of Birkerød, Denmark). A laser source 310 (e.g., a laser generating light having a wavelength of about 1545 nanometers, such as Model D2525P41 available from Lucent Technologies Inc.) is equipped with a laser mount to control the temperature of the laser (e.g., Newport 740 Series laser mount) optically coupled to the hollow-core PBF 210 via a first SMF 320 (e.g., SMF28 available from Corning, Inc. of Corning, N.Y.) and a first polarizer 330. Examples of lasers compatible with certain embodiments described herein include, but are not limited to, diode lasers and tunable lasers. Examples of polarizers compatible with certain embodiments described herein include, but are not limited to, Model 10GT04 available from Newport Corporation of Irvine, Calif. The first polarizer 330 can be adjusted to introduce light to the hollow-core PBF 210 having a selected input polarization. The output of the hollow-core PBF 210 is optically coupled to a power meter 360 via a second polarizer 340 and a second SMF 350. The second polarizer 340 can be adjusted to select the output polarization which is measured by the power meter 360. Examples of power meters compatible with certain embodiments described herein include, but are not limited to, Model 8509B lightwave polarization analyzer system available from Agilent Technologies, Inc. of Santa Clara, Calif. In certain embodiments, the second SMF 350 is butt-coupled to the output end of the hollow-core PBF 210. The second SMF 350 advantageously filters out any surface modes and any higher-order modes.

Figure 13A:
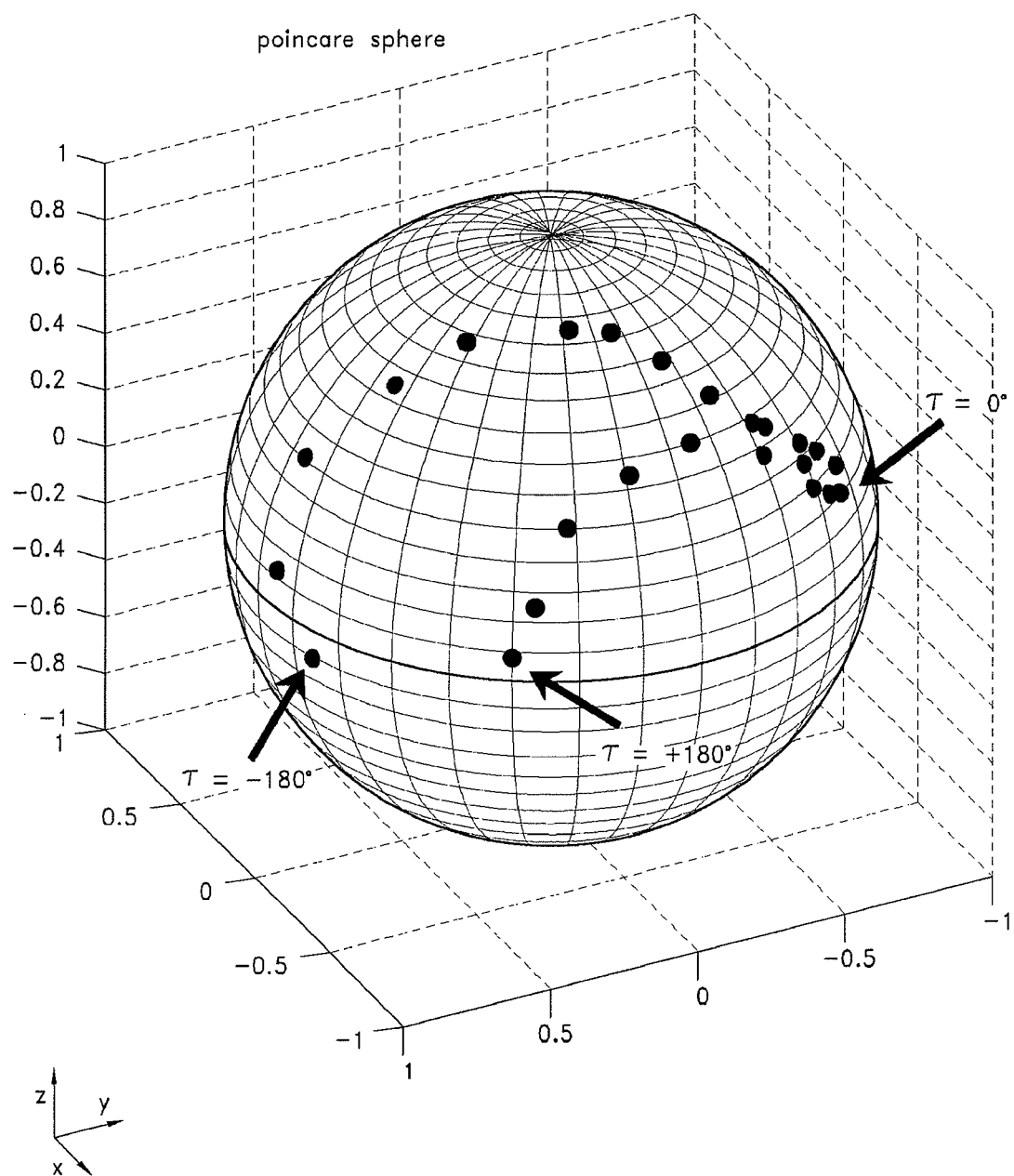
FIG. 13A illustrates the evolution of the output state of polarization for incrementally larger twists applied to the twisted portion of the hollow-core photonic-bandgap fiber.

For a given linear input SOP, FIG. 13A illustrates the evolution of the output SOP for incrementally larger twists applied to at least a portion of the hollow-core PBF 210, first a positive twist up to 180°, then a negative twist up to −180°, recording the measured power for every 15° of twist. As the hollow-core PBF 210 is twisted, the range of output polarizations subtends a substantial portion of the Poincaré sphere. The measurements illustrated by FIG. 13A show that when twisting a hollow-core PBF 210, both the orientation and ellipticity of the output SOP are modified substantially. The output polarization evolves on a substantial path on the Poincaré sphere, so the twisted portion of the hollow-core PBF 210 can be used as a polarization controller. In addition, FIG. 13A illustrates an asymmetry between positive and negative twists of the hollow-core PBF 210.

Figure 13B:
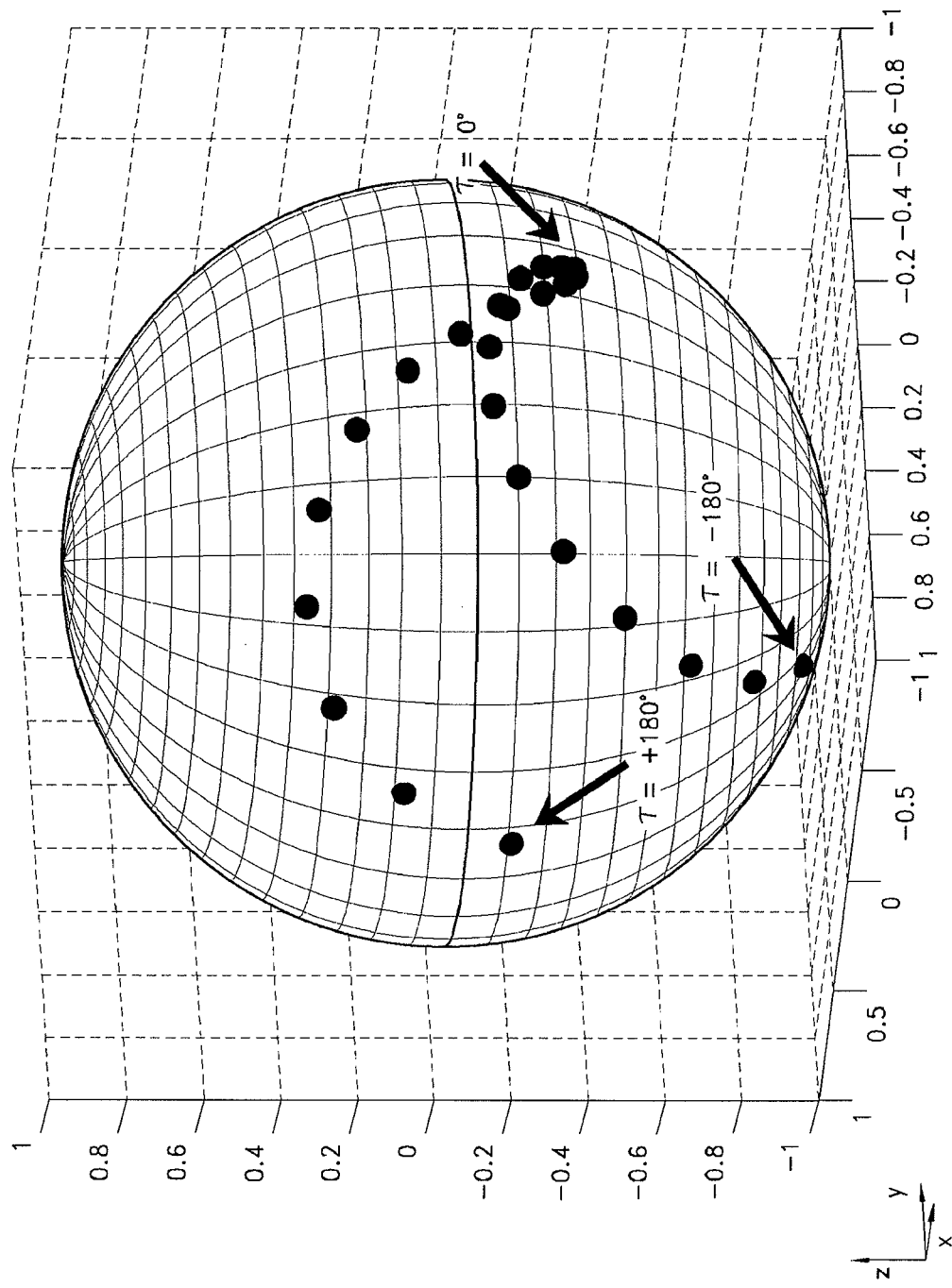
FIG. 13B illustrates the results of a calculated model of the evolution of the output state of polarization for the configuration of FIG. 12.

FIG. 13B illustrates the results of a calculated model of the evolution of the output SOP for the configuration of FIG. 12. To compare the measured data of FIG. 13A with the model, it was assumed that $\delta_l$ and $\delta_c$ were uniform, thus the same values of $\delta_l$ and $\delta_c$ were used in $M_+$ and $M_-$. The parameters used to fit the simulations to the experimental data were the angle of the fiber principal axes in the laboratory frame and the intrinsic phase delays $\delta_l$ and $\delta_c$, both assumed to be independent of the twist. Additionally, a small linear birefringence (total phase delay of 0.6 radians) and its orientation were fitted to account for the birefringence of the hollow-core PBF 210 and the SMF28 fiber output leads. Comparison to FIG. 13A shows that the experimental and simulated results are in good qualitative agreement, including the asymmetry for positive and negative twists. The fitted values of $\delta_l$ (−22.6 radians) and $\delta_c$ (−6.6 radians) are in reasonable agreement with independent measurements of the birefringence of the hollow-core PBF 210 (linear beat length of 6.5±1.5 centimeters, and circular beat length about 6 times longer). The slight disagreement that occurs when the fiber is twisted most likely originates from the assumptions that (1) $\delta_l$ and $\delta_c$ are uniform, which have been observed experimentally not to be quite true, and (2) the twist does not affect the fiber's native linear and circular birefringence, which may be incorrect since twisting likely warps the photonic-crystal lattice of the twisted portion of the hollow-core PBF 210.

Figure 14A:
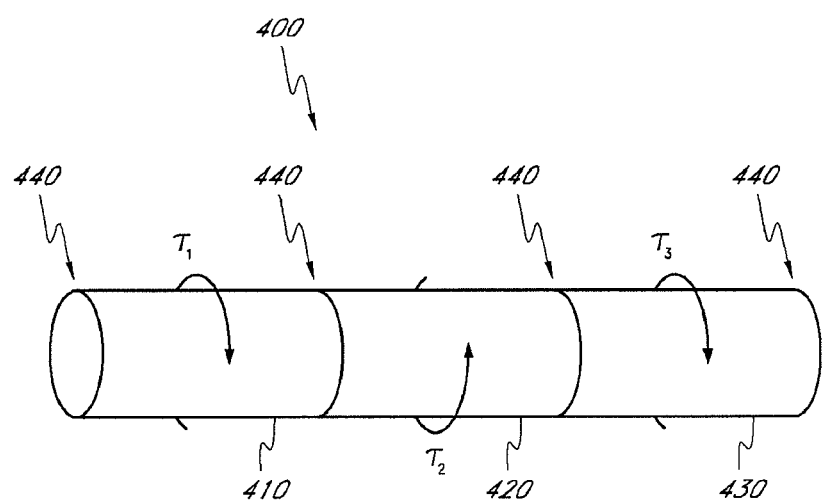
FIG. 14A schematically illustrates a polarization controller comprising a twisted portion of a first hollow-core photonic-bandgap fiber, a twisted portion of a second hollow-core photonic-bandgap fiber, and a twisted portion of a third hollow-core photonic-bandgap fiber.
Figure 14B:
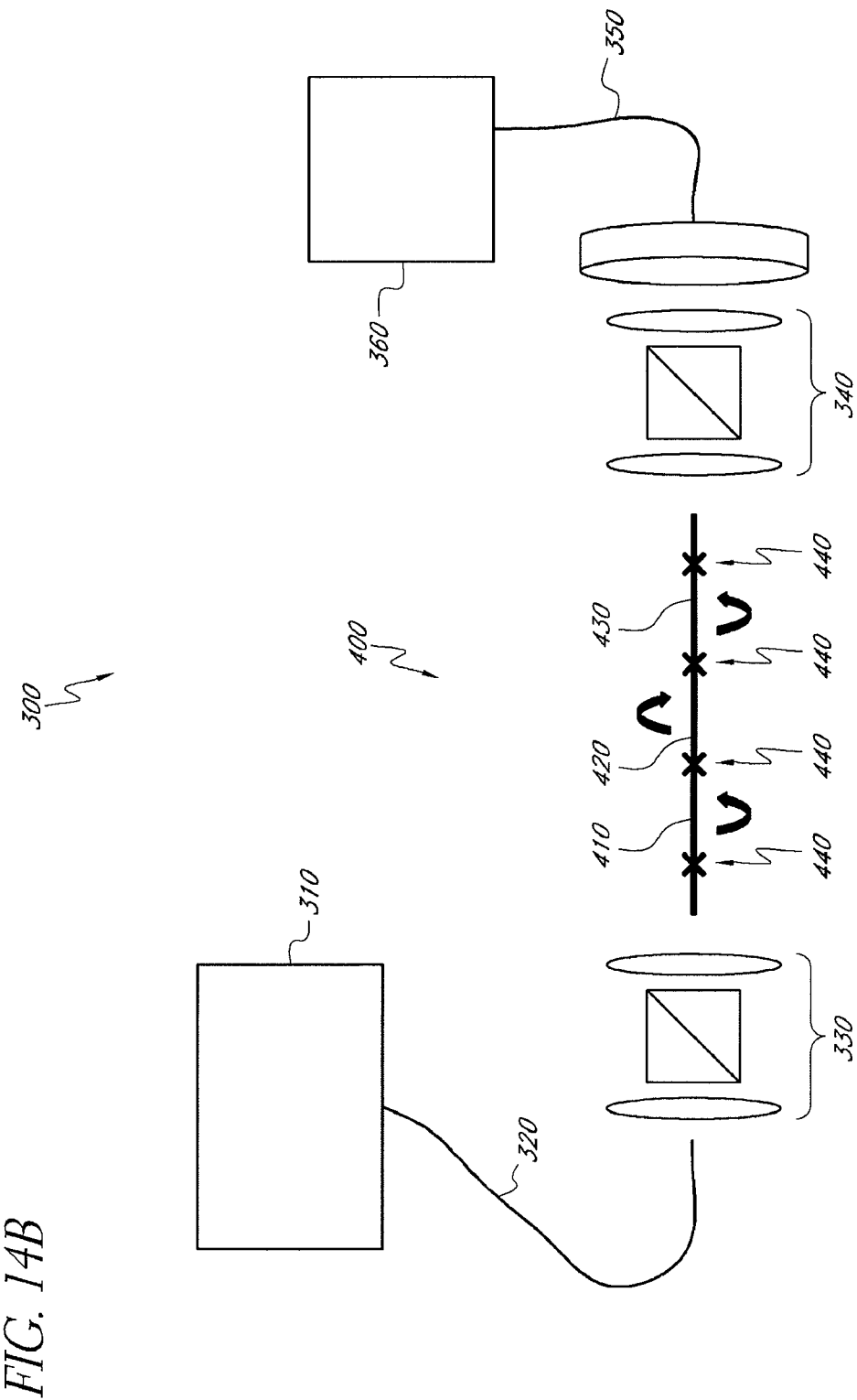
FIG. 14B schematically illustrates the configuration of FIG. 12 used to measure the effects of the polarization controller of FIG. 14A.

FIG. 14A schematically illustrates a polarization controller 400 comprising a first twisted portion of a hollow-core PBF 410, a second twisted portion of a hollow-core PBF 420 optically coupled to the first twisted portion of the hollow-core PBF 410, and a third twisted portion of a hollow-core PBF 430 optically coupled to the twisted portion of the second hollow-core PBF 420. Each of the twisted portions of the hollow-core PBFs 410, 420, 430 is between two fixed portions 440 of the polarization controller 400. FIG. 14B schematically illustrates the configuration 300 of FIG. 12 used to measure the effects of the polarization controller 400.

The twisted portion of the third hollow-core PBF 430 of certain embodiments has a third longitudinal axis and is twisted about the third longitudinal axis. In certain embodiments, the first longitudinal axis, the second longitudinal axis, and the third longitudinal axis are substantially parallel to one another, while in certain other embodiments, at least one of the longitudinal axes is not substantially parallel to either of the other two longitudinal axes. At least one of the twisted portions of the hollow-core PBFs 410, 420, 430 can be curved or bent such that the corresponding longitudinal axes are not straight lines. In certain embodiments, the hollow-core PBFs 410, 420, 430 are the same hollow-core PBF.

As shown in FIG. 14A, the twisted portion of the first hollow-core PBF 410 is twisted in a first direction about the first longitudinal axis, the twisted portion of the second hollow-core PBF 420 is twisted in a second direction about the second longitudinal axis, and the twisted portion of the third hollow-core PBF 430 is twisted in a third direction about the third longitudinal axis. The third direction of certain embodiments is generally opposite to the second direction and the second direction of certain embodiments is generally opposite to the first direction.

In certain embodiments, the twisted portion of the first hollow-core PBF 410 has a length approximately equal to a first beat length of the twisted portion of the first hollow-core PBF 410, the twisted portion of the second hollow-core PBF 420 has a length approximately equal to a second beat length of the twisted portion of the second hollow-core PBF 420, and the twisted portion of the third hollow-core PBF 430 has a length approximately equal to a third beat length of the twisted portion of the third hollow-core PBF 430. In certain embodiments, the first beat length, the second beat length, and the third beat length are approximately equal to one another. In certain other embodiments, at least one of the first, second, and third beat lengths is not equal to the other beat lengths. In certain other embodiments, none of the first, second, and third beat lengths are equal to one another.

The twisted portion of the first hollow-core PBF 410 can comprise an end of the first hollow-core PBF 410. The twisted portion of the second hollow-core PBF 420 can comprise an end of the second hollow-core PBF 420. The twisted portion of the third hollow-core PBF 430 can comprise an end of the third hollow-core PBF 430. The twisted portion of the first hollow-core PBF 410 can be between a first fixed portion and a second fixed portion of the first hollow-core PBF 410. The twisted portion of the second hollow-core PBF 420 can be between a first fixed portion and a second fixed portion of the second hollow-core PBF 420. The twisted portion of the third hollow-core PBF 430 can be between a first fixed portion and a second fixed portion of the third hollow-core PBF 430. One or more of the fixed portions of the first, second, and third hollow-core PBFs 410, 420, 430 can be at the ends of the corresponding hollow-core PBFs 410, 420, 430.

In certain embodiments, each of the twisted portions of the hollow-core PBFs 410, 420, 430 has a length in a range between 4 centimeters and 6.5 centimeters, although other lengths are also compatible with certain embodiments described herein. For example, the same hollow-core PBF can be held at four positions to form three 6-centimeter-long segments to be twisted. By adjusting the amount of twist in each of the hollow-core PBFs 410, 420, 430, various input SOPs can be transformed into various linear, circular, and elliptical target output SOPs. Random variation of the twist angle in each of the three segments of certain embodiments produces an output SOP that covers the entire Poincaré sphere. Similar results can be obtained for random variations of the input SOP, confirming that the set of three twisted PBF sections constitutes a universal polarization controller. In addition, there are no indications that insertion loss or polarization dependent loss of the fiber are significant effects in certain embodiments of the polarization controller described herein. In certain embodiments, at least 20 dB of extinction can be achieved between the target output SOP and the SOP orthogonal to the target output SOP. Certain other embodiments further comprise additional twisted portions of one or more hollow-core PBFs which can be twisted to improve the extinction of the polarization controller.

Since the phase delay accumulated by two orthogonally polarized signals as they travel through a fiber depends on wavelength, in general, two signals with different wavelengths but the same polarization will exit a fiber with different polarizations. This effect can limit the wavelength range that can be simultaneously controlled by a given polarization controller. In certain embodiments, the bandwidth of the polarization controller operating at a wavelength of about 1550 nanometers is about 6 nanometers for control to within 5% of the same SOP, such that outside this bandwidth, less than 95% of the power is in the desired SOP at the output. In contrast, a conventional loop polarization controller has a bandwidth of about 150 nanometers. One reason for this difference is that the birefringence of the PBF decreases with wavelength, which reduces the bandwidth. If the birefringence did not change with wavelength, greater bandwidths can be achieved. If the birefringence is proportional to the wavelength, greater bandwidths can be achieved. Another reason is that a conventional fiber polarization controller is made from three quarter-wave sections of fiber, while the twist-based polarization controller of certain embodiments utilizes three sections that are each one beat length long. However, in spite of its small bandwidth, a twist-based PBF polarization controller in accordance with certain embodiments described herein is a useful device for controlling the SOP of laser light.

Figure 15:
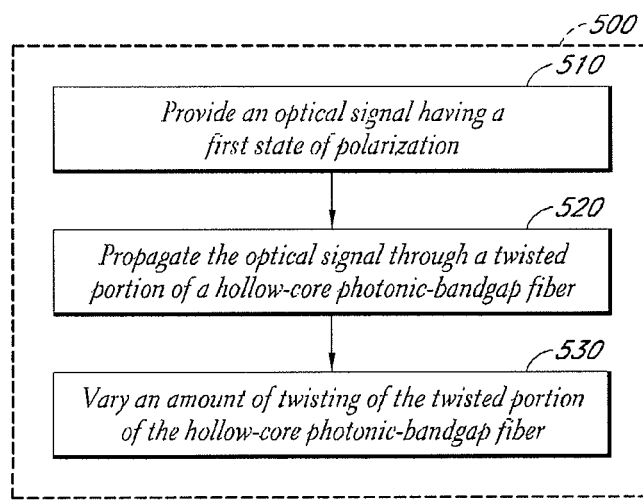
FIG. 15 is a flow diagram of an example method for modifying the polarization of an optical signal in accordance with certain embodiments described herein.

FIG. 15 is a flow diagram of an example method 500 for modifying the polarization of an optical signal in accordance with certain embodiments described herein. In an operational block 510, the method 500 comprising providing an optical signal having a first state of polarization. In an operational block 520, the method 500 further comprises propagating the optical signal through at least a portion of a hollow-core photonic-bandgap fiber having a longitudinal axis and twisted about the longitudinal axis such that the optical signal is outputted from the twisted portion of the hollow-core photonic-bandgap fiber with a second state of polarization different from the first state of polarization. In certain embodiments, the method 500 further comprises an operational block 530 in which an amount of twisting of the twisted portion of the hollow-core photonic-bandgap fiber about the longitudinal axis is varied to select the second state of polarization.

Various embodiments of the present invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. An optical device configured to receive light having a wavelength, the optical device comprising a first hollow-core photonic-bandgap fiber portion coupled to a rotation stage, the first portion configured to be adjustably axially twisted along a length of the first portion by the rotation stage, the length approximately equal to a first beat length of the first portion, the first beat length dependent on the wavelength.

2. The device of claim 1, wherein the first portion is positioned between and optically coupled to two fixed hollow-core photonic-bandgap fiber portions.

3. The device of claim 1, further comprising a second hollow-core photonic-bandgap fiber portion optically coupled to the first portion, wherein the second portion is configured to be adjustably axially twisted.

4. The device of claim 3, wherein the first portion is configured to be adjustably axially twisted in a first direction and the second portion is configured to be adjustably axially twisted in a second direction, the second direction generally opposite to the first direction.

5. The device of claim 3, wherein the second portion is configured to be adjustably axially twisted along a length approximately equal to a second beat length of the second portion, the second beat length dependent on the wavelength.

6. The device of claim 3, further comprising a third hollow-core photonic-bandgap fiber portion optically coupled to the second portion, wherein the third portion is configured to be adjustably axially twisted.

7. The device of claim 6, wherein the first portion is configured to be adjustably axially twisted in a first direction, the second portion is configured to be adjustably axially twisted in a second direction, and the third portion is configured to be adjustably axially twisted in a third direction.

8. The device of claim 7, wherein the third direction is generally opposite to the second direction.

9. The device of claim 8, wherein the second direction is generally opposite to the first direction.

10. The device of claim 6, wherein the second portion is configured to be adjustably axially twisted along a length approximately equal to a second beat length of the second portion, and the third portion is configured to be adjustably axially twisted along a length approximately equal to a third beat length of the third portion, the second beat length and the third beat length dependent on the wavelength.

11. The device of claim 10, wherein the first beat length, the second beat length, and the third beat length are approximately equal to one another.

12. The device of claim 10, wherein at least one of the first beat length, the second beat length, and the third beat length is not equal to the other beat lengths.

13. The device of claim 1, further comprising a single-mode fiber portion and a second hollow-core photonic-bandgap fiber portion, wherein the single-mode fiber portion is positioned between and optically coupled to the first portion and the second portion.

14. The device of claim 13, wherein the first portion is configured to be adjustably axially twisted in a first direction and the second portion is configured to be adjustably axially twisted in a second direction, with the second direction generally opposite to the first direction.

15. The device of claim 1, wherein the wavelength is in the range between about 1545 nanometers and about 1550 nanometers.

16. The device of claim 1, wherein the first beat length is in the range between about 1 centimeter and about 10 centimeters.

17. A polarization controller configured to receive light having a wavelength, the polarization controller comprising a first hollow-core photonic-bandgap fiber portion coupled to a rotation stage, the first portion configured to be adjustably axially twisted along a length of the first portion by the rotation stage, the length approximately equal to a first beat length of the first portion, the first beat length dependent on the wavelength.

18. A method of modifying a state of polarization of light, the method comprising:
    providing light having a wavelength and a first state of polarization;
    propagating the light through a hollow-core photonic-bandgap fiber portion coupled to a rotation stage, the portion configured to be adjustably axially twisted along a length by the rotation stage, the length approximately equal to a beat length of the portion, the beat length dependent on the wavelength, wherein the portion has an amount of twisting configured to be varied; and
    outputting the light from the portion with a second state of polarization different from the first state of polarization.

19. The method of claim 18, further comprising varying the amount of twisting of the portion to select the second state of polarization.

20. The method of claim 18, wherein the portion is positioned between and optically coupled to two fixed hollow-core photonic-bandgap fiber portions.

21. The method of claim 18, wherein the beat length of the portion is in the range between about 1 centimeter and about 10 centimeters.

22. The controller of claim 17, wherein the first portion comprises a twisted portion and a fixed portion.

23. The controller of claim 22, wherein the twisted portion is affixed to the rotation stage and the fixed portion is affixed to a stationary structure.

24. The controller of claim 23, wherein the twisted portion is affixed to the rotation stage by epoxy, wax, or mechanical clamps and the fixed portion is affixed to the stationary structure by epoxy, wax, or mechanical clamps.

25. The controller of claim 17, wherein the beat length is in the range between about 4 centimeters and about 6.5 centimeters.

26. The controller of claim 17, further comprising a second hollow-core photonic-bandgap fiber portion optically coupled to the first portion, wherein the second hollow-core photonic-bandgap fiber portion is configured to be adjustably axially twisted.

27. The controller of claim 26, wherein each of the first portion and the second hollow-core photonic-bandgap fiber portion is between two fixed portions.

* * * * *

UNITED STATES PATENT AND TRADEMARK OFFICE
CERTIFICATE OF CORRECTION

PATENT NO. : 8,965,164 B2
APPLICATION NO. : 12/575330
DATED : February 24, 2015
INVENTOR(S) : Matthew A. Terrel et al.

It is certified that error appears in the above-identified patent and that said Letters Patent is hereby corrected as shown below:

In the specification,

In column 6 at line 4, Change "$\tau_c$" to --$\delta_c$--.

Signed and Sealed this
Twenty-second Day of March, 2016

Michelle K. Lee
*Director of the United States Patent and Trademark Office*